US010852861B2

(12) United States Patent
Kim et al.

(10) Patent No.: US 10,852,861 B2
(45) Date of Patent: Dec. 1, 2020

(54) DISPLAY DEVICE WITH DECORATIVE PRINT PATTERN AND ATTACHMENT ASSISTING LAYER COMPRISING OVERLAPPING OPENINGS IN A NON-DISPLAY AREA

(71) Applicant: Samsung Display Co. Ltd., Yongin-si (KR)

(72) Inventors: Dong Sup Kim, Hwaseong-si (KR); Ju Suk Oh, Asan-si (KR); Jung A Lee, Osan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 15/903,881

(22) Filed: Feb. 23, 2018

(65) Prior Publication Data

US 2019/0079604 A1    Mar. 14, 2019

(30) Foreign Application Priority Data

Sep. 13, 2017    (KR) .................. 10-2017-0116926

(51) Int. Cl.
*G06F 3/041*     (2006.01)
*G02F 1/1333*    (2006.01)

(52) U.S. Cl.
CPC ........ *G06F 3/041* (2013.01); *G02F 1/133308* (2013.01); *B32B 2457/20* (2013.01); *G02F 2001/13332* (2013.01); *G02F 2001/133331* (2013.01)

(58) Field of Classification Search
CPC ........ G06F 1/16; G06F 1/1601; G06F 1/1613; G06F 1/1626; G06F 1/1633; G06F 1/1637; G06F 1/1643; G02F 1/133308; G02F 2001/133311–133334; B32B 2457/20–208
See application file for complete search history.

(56) References Cited

U.S. PATENT DOCUMENTS

| 8,467,177 | B2* | 6/2013 | Mathew | H04M 1/0264 361/679.21 |
| 8,717,513 | B2* | 5/2014 | Park | G06F 1/1637 349/58 |
| 8,896,800 | B2* | 11/2014 | Park | G02F 1/1313 349/153 |
| 9,372,505 | B2* | 6/2016 | Mathew | G06F 1/1637 |
| 9,874,907 | B2* | 1/2018 | Wang | G06F 1/1684 |
| 9,886,613 | B2* | 2/2018 | Pi | G06F 1/1626 |
| 10,133,111 | B2* | 11/2018 | Lee | G02F 1/133512 |
| 2012/0113236 | A1* | 5/2012 | Joynes | G06F 1/1626 348/51 |

(Continued)

FOREIGN PATENT DOCUMENTS

| KR | 10-2013-0131017 A | 12/2013 |
| KR | 10-1561914 B1 | 10/2015 |

*Primary Examiner* — Gene W Lee
(74) *Attorney, Agent, or Firm* — Innovation Counsel LLP

(57) ABSTRACT

A display device includes a window, and a decorative print pattern and an attachment assisting layer sequentially disposed on the window, wherein the decorative print pattern includes a first opening having a closed curved shape and exposing the window, the attachment assisting layer includes a second opening overlapping the first opening and exposing the window, and the second opening includes a first open portion exposing an edge of the first opening.

20 Claims, 9 Drawing Sheets

(56) References Cited

U.S. PATENT DOCUMENTS

| | | | |
|---|---|---|---|
| 2012/0206669 A1* | 8/2012 | Kim | G06F 1/1686 |
| | | | 349/58 |
| 2013/0313672 A1* | 11/2013 | Min | G02B 5/005 |
| | | | 257/434 |
| 2017/0068287 A1* | 3/2017 | Jung | G06F 1/1686 |
| 2017/0075174 A1* | 3/2017 | Lee | G02F 1/13394 |
| 2017/0277219 A1* | 9/2017 | Chung | H04N 5/2257 |
| 2018/0026152 A1* | 1/2018 | Benson | G06F 1/1643 |
| | | | 257/82 |

* cited by examiner

DISPLAY DEVICE WITH DECORATIVE PRINT PATTERN AND ATTACHMENT ASSISTING LAYER COMPRISING OVERLAPPING OPENINGS IN A NON-DISPLAY AREA

This application claims priority from Korean Patent Application No. 10-2017-0116926 filed on Sep. 13, 2017 in the Korean Intellectual Property Office, the disclosure of which is incorporated herein by reference in its entirety.

BACKGROUND

1. Field of the Invention

The present inventive concept relates to a display device.

2. Description of the Related Art

A display device is a device displaying an image, and is used in various products, including smart phones. The display device includes a display panel displaying an image, a window disposed over the display panel and protecting the display panel, and a bracket disposed under the display panel and accommodating the display panel.

In addition, the functionality of display devices have expanded to include photographing and capturing videos, and includes a camera disposed under the window for this purpose. The window includes a decorative print pattern for preventing the visual recognition of a non-display area, and an attaching member for assisting the attachment to the bracket. In this case, openings are formed in the decorative print pattern and the attaching member to preventing the deterioration of image quality of the camera.

SUMMARY

An aspect of the present inventive concept is to provide a display device that can prevent the deterioration of image quality of a camera.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below.

According to an aspect of the inventive concept, there is provided a display device comprising a display panel comprising a window, and a decorative print pattern and an attachment assisting layer sequentially disposed on the window, wherein the decorative print pattern includes a first opening having a closed curved shape and exposing the window, the attachment assisting layer includes a second opening overlapping the first opening and exposing the window, and the second opening includes a first open portion exposing an edge of the first opening.

According to another aspect of the inventive concept, there is provided a display device comprising a window, a first decorative print layer disposed on the window and including a first opening having a closed curved shape, a second decorative print layer disposed on the first decorative print layer and including a second opening having a closed curved shape, and an attachment assisting layer disposed on the second decorative print layer and including a third opening, wherein the first to third openings overlap each other and are spatially connected to each other to expose the window, the second opening surrounds an edge of the first opening, and the third opening includes an open portion exposing an edge of the second opening.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Figure 1:
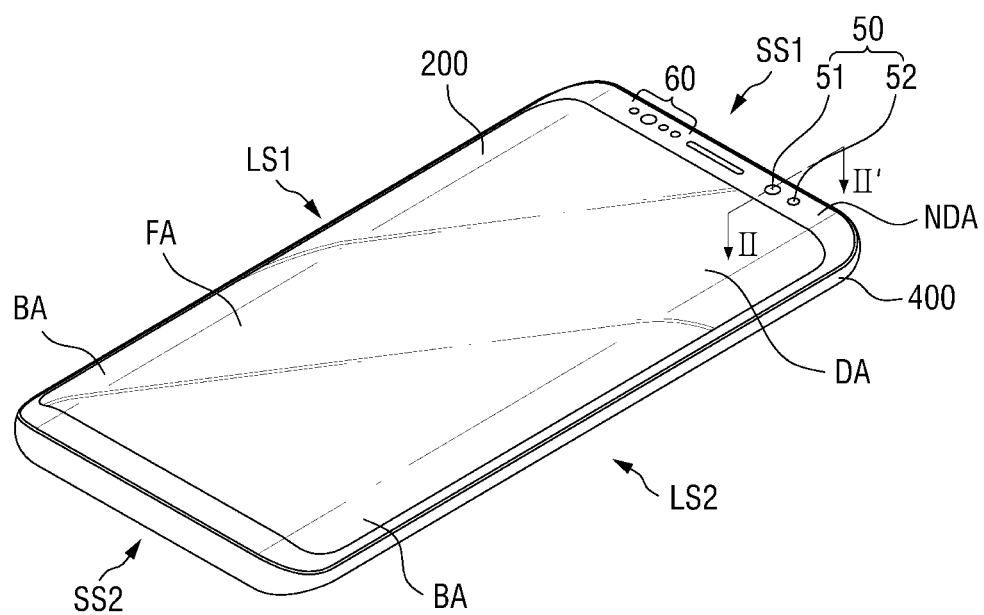
FIG. 1 is a perspective view of a display device according to an embodiment.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined within the scope of the appended claims.

Cases where elements or layers are referred to as being located "on" other elements or layers include all the cases where other layers or other elements are interposed directly on or between other elements. Meanwhile, cases where the elements are "directly on" indicate that no other element or layer is interposed therebetween. Same reference numerals refer to the same constituent elements throughout the specification. Term 'and/or" includes each and every combination of one or more of the referenced items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present inventive concept.

Hereinafter, embodiments of the present inventive concept will be described with reference to the attached drawings.

Figure 2:
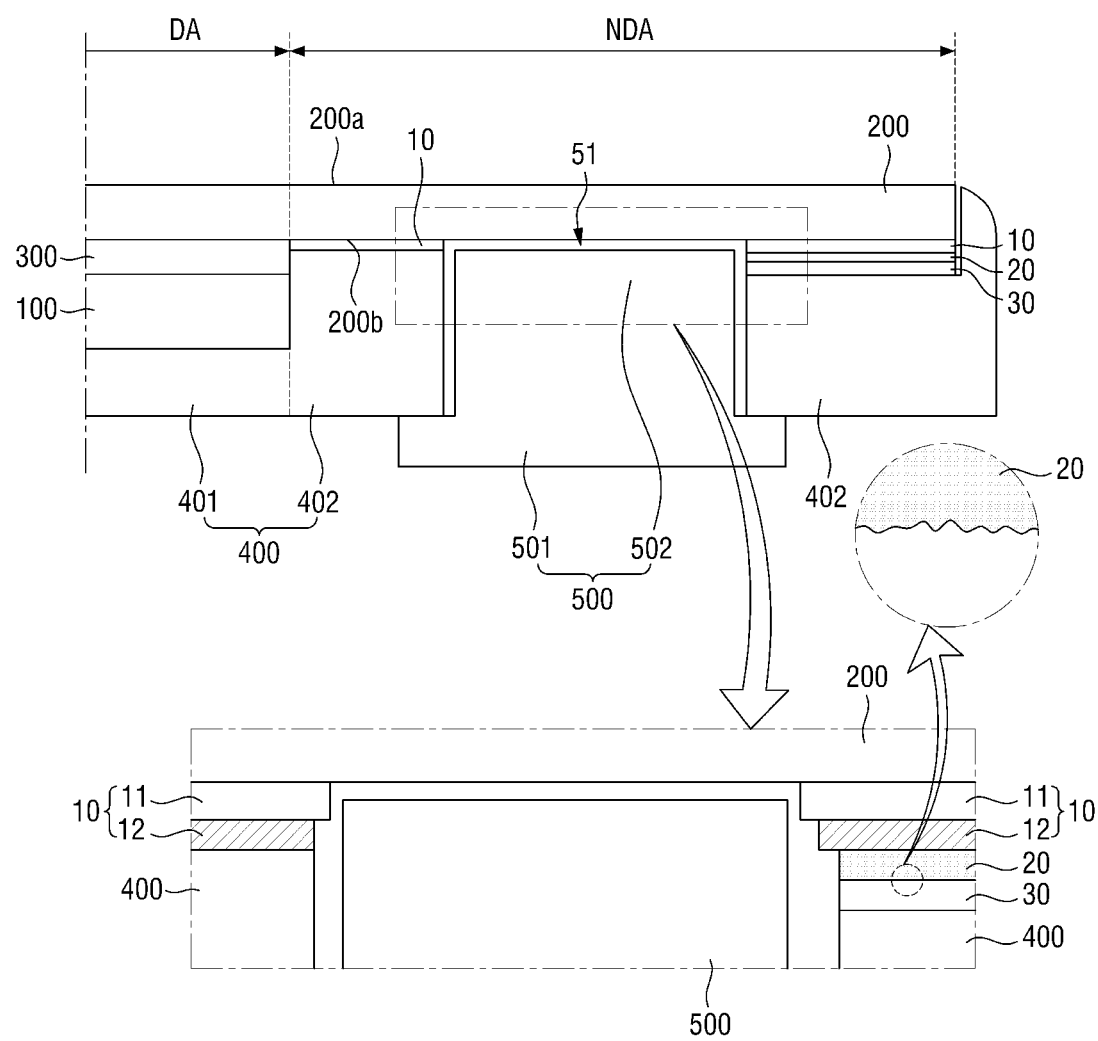
FIG. 2 is a sectional view taken along the line II-II' of FIG. 1.

FIG. 1 is a perspective view of a display device according to an embodiment. FIG. 2 is a sectional view taken along the line II-II' of FIG. 1.

Referring to FIGS. 1 and 2, a display device 1 includes a display panel 100 and a window 200 disposed over the display panel 100. The display device 1 may include a bracket 400 disposed under the display panel 100.

Unless otherwise defined, in this specification, the "on or over" and "upper surface" refer to a side of a display surface with respect to the display panel 100, and the "beneath or under" and "lower surface" refer to the opposite side of a display surface with respect to the display panel 100.

The display device 1 may have a rectangular shape in a plan view. The display device 1 may include both long sides LS1 and LS2 facing each other and both short sides SS1 and SS2 facing each other. The corners where the long sides LS1 and LS2 of the display device 1 meet and the short sides SS1 and SS2 thereof may be right angles, but may be curved or rounded as shown in FIG. 1. The planar shape of the display device 1 is not limited to the above illustrated one, and may include a circular shape or other shapes.

The display device includes a display area DA and a non-display area NDA in a plan view. The display area DA is an area where an image is displayed, and the non-display area NDA is an area where an image is not displayed. The non-display area NDA is disposed around the display area DA. For example, when the display area DA has a rectangular shape, the non-display area NDA may be disposed along four sides of the display area DA.

In an embodiment, the display device 1 may include a flat portion FA and a bending portion BA connected with the flat portion FA and disposed around the flat portion FA. The flat portion FA is generally disposed on one plane. The bending portion BA is not placed on the same plane as the flat portion FA. For example, the bending portion BA may be bent or warped in a downward direction from a plane where the flat portion FA is located.

In an embodiment, the bending portion may have a curved surface bent convexly in an outward direction. In another embodiment, the bending portion BA may have a flat surface, and the flat surface of the bending portion BA may be located on a plane having a predetermined angle with respect to the plane of the flat portion FA.

The bending portion BA may be located at the both long sides LS1 and LS2 or one long side LS1 or LS2 of the display device 1 having a rectangular shape. Although not shown in the drawings, the short sides SS1 and SS2 of the display device may also be bent, i.e. may each have a bending portion BA.

The aforementioned display area DA may be located over the flat portion FA and the bending portion BA. Further, the display panel 100, a touch member 300, the window 200, and the bracket 400, which will be described later, may all be located over the flat portion FA and the bending portion BA.

The display panel 100 is a panel for displaying a screen, and, for example, an organic light emitting display panel may be used as the display panel 100. In the following embodiments, an organic light emitting display panel is used as the display panel 100. However, the present inventive concept is not limited thereto, and other kinds of display panels such as a liquid crystal display panel and an electrophoretic display panel may be used as the display panel 100.

The display panel 100 includes a plurality of organic light emitting elements arranged on a substrate (not shown). The substrate may be a rigid substrate made of glass or the like, or may be a flexible substrate made of polyimide or the like. When a polyimide substrate is used as the substrate, the display panel 100 may be bent, warped, folded, or rolled.

The window 200 is disposed over the display panel 100. The window 200 is disposed over the display panel 100 to protect the display panel and transmit the light emitted from the display panel 100. The window may be made of glass or the like.

The window 200 may overlap the display panel 100, and may be disposed to cover the entire surface of the display panel 100. The window 200 may be larger than the display panel 100. For example, the window 200 may protrude outward from the display panel 100 at both short sides SS1 and SS2 of the display device 1. Although the window 200 may also protrude outward from the display panel 100 even at both the long sides LS1 and LS2 of the display device 1, the protrusion distance at both short sides SS1 and SS2 may be larger than the protrusion distance at both long sides LS1 and LS2. The side surface of the display panel 100 may be substantially aligned with a boundary between the display area DA and the non-display area NDA.

In an embodiment, a touch member 300 may be disposed between the display panel 100 and the window 200. The touch member 300 may be a rigid panel type touch member, a flexible panel type touch member, or a film type touch member. The touch member 300 has substantially the same size as the display panel 100, and is disposed to overlap the display panel 100. The side surface of the display panel 100 and the side surface of the touch member 300 may be aligned, but the present inventive concept is not limited thereto. The display panel 100 and the touch member 300, and the touch member 300 and the window 200 may be respectively attached to each other by a transparent attaching member 30 such as optical clear adhesive (OCA) or optical clear resin (OCR). The touch member 300 may be omitted. In this case, the window 200 and the touch member 300 may be directly attached to each other by the transparent attaching member 30. In some embodiments, the display panel 100 may further include a touch electrode therein.

The window 200 may include a decorative print pattern 10 and an attachment assisting layer 20. The decorative print pattern 10 and the attachment assisting layer 20 may be disposed on the lower surface 200b of the window 200. The decorative print pattern 10 and the attachment assisting layer 20 overlap the non-display area NDA, and do not overlap the display area DA.

The decorative print pattern 10 absorbs or reflects the light incident on the upper surface 200a and/or lower surface 200b of the window 200, and provides a color to the bezel of the display device 1. The decorative print pattern 10 may be disposed continuously along the non-display area NDA. In other words, the decorative print pattern 10 may be continuously disposed along the edge of the display area DA.

The decorative print pattern 10 may include an opaque material. For example, the decorative print pattern 10 may include a material having deep blue, midnight black, orchid gray or other colors. The color of the decorative print pattern 10 disposed in the non-display area NDA may be recognized by a user as a frame color on the outskirt of a screen, thereby providing a sense of beauty to the user.

The decorative print pattern 10 includes a plurality of decorative print layers. For example, the decorative print pattern 10 may include a first decorative print layer 11 and a second decorative print layer 12. However, the present inventive concept is not limited thereto, and the decorative print pattern 10 may include three or more decorative print layers.

In an embodiment, the first decorative print layer 11 and the second decorative print layer 12 may be formed to have the same color. When the first decorative print layer 11 and the second decorative print layer 12, having the same color, are laminated, a more distinct color can be expressed. For example, when double tone printing is performed, two decorative print layers having the same color are laminated, which shows a clearer color compared to when a single tone printing where one decorative print layer is disposed is performed.

In another embodiment, the first decorative print layer 11 and the second decorative print layer 12 may be formed to have different colors from each other. For example, when the first decorative print layer 11 is formed to have a low saturation color, the second decorative print layer 12 may be formed to have a white color, so that the color of the first decorative print layer 11 can be more clearly expressed.

An attachment assisting layer 20 is disposed beneath the decorative print pattern 10. The attachment assisting layer 20 is disposed to overlap the decorative print pattern 10, and may be smaller than the decorative print pattern 10. The decorative print pattern 10 protrudes from the side surface of the attachment assisting layer 20, so that the lower surface of the decorative print pattern 10 may be exposed. The decorative print pattern 10 and the attachment assisting layer 20 may be in direct contact with each other.

The attachment assisting layer 20 can perform a function of increasing the attachment force between the decorative printed pattern 10 and an attaching member 30 to be described later. That is, when the attachment assisting layer 20 is disposed between the attaching member 30 and the decorative print pattern 10, the attachment force can increase, compared to when the attaching member 30 is directly disposed on the lower surface of the decorative print pattern 10.

An uneven shape can be formed on the lower surface of the attachment assisting layer 20 to increase the attachment force to the attaching member 30. In general, when the lower surface has an uneven shape, surface roughness increases to increase a friction coefficient, and a contact area with the attaching member increases to increase attachment force. For example, if the attachment assisting layer 20 were omitted, the attaching member 30 is directly attached to the lower surface of the decorative print pattern 10, and, in this case, the lower surface of the decorative print pattern 10 may have lower surface roughness than the lower surface of the attachment assisting layer 20. The lower surface of the decorative print pattern 10 having a smooth surface may have a low friction coefficient with respect to the attaching member 30, and the area of the decorative print pattern 10 in contact with the attaching member 30 may be relatively small. Accordingly, the attachment force between the attaching member 30 and the decorative print pattern 10 may be relatively low. In contrast, the lower surface of the attachment assisting layer 20 may have high surface roughness because it includes an uneven pattern. Since the lower surface of the attachment assisting layer 20 has an uneven shape, the contact area of the attachment assisting layer 20 with the attaching member 30 may increase, and the friction coefficient between the attachment assisting layer 20 and the attaching member 30 may increase. Thus, the attaching member 30 has high attachment force to the attachment assisting layer 20, and may thus be more firmly attached to the attachment assisting layer 20. The surface of the attachment assisting layer 20 will be described with reference to FIG. 3.

Figure 3:
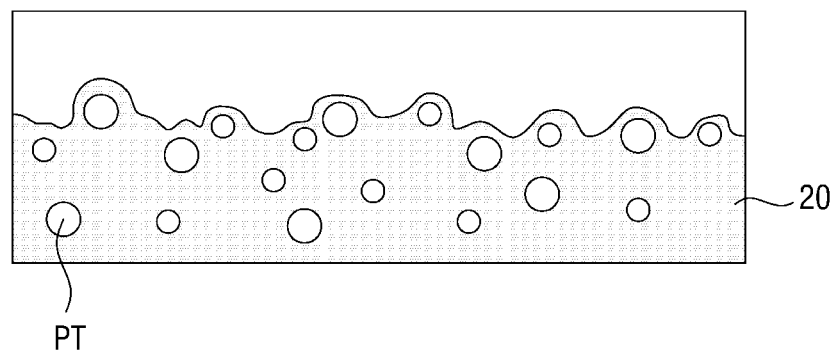
FIG. 3 is a sectional view of an attachment assisting layer according to an embodiment.

FIG. 3 is a sectional view of an attachment assisting layer according to an embodiment.

Referring to FIG. 3, the attachment assisting layer 20 may include one or more kinds of particles PT. The particles PT may spread evenly in a binder resin constituting the attachment assisting layer 20 to form irregularities on the surface of the attachment assisting layer 20. The sizes of the plurality of particles PT may all be the same or may vary. The size of the particles PT may be similar to the thickness of the attachment assisting layer 20 or may be smaller than the thickness of the attachment assisting layer 20. If the size of the particles PT is too large in comparison with the thickness of the attachment assisting layer 20, the attachment force to the attaching member 30 may be rather deteriorated.

The particles PT may include inorganic microparticles and/or organic microparticles. Examples of the inorganic microparticles may include silica ($SiO_2$) microparticles, alumina microparticles, titania microparticles, tin oxide microparticles, zinc oxide microparticles, and examples of the organic microparticles may include polystyrene beads, melamine resin beads, acrylic beads, acryl-styrene beads, silicone beads, benzoguanamine beads, benzoguanamine-formaldehyde condensed beads, polycarbonate beads, and polyethylene beads. However, examples of the particles PT are not limited thereto.

In another embodiment, unlike FIG. 3, the attachment assisting layer 20 may have irregularities on the surface thereof by processing the surface of the attachment assisting layer 20 instead of including the particles PT. For example, irregularities may be formed on the surface of the attachment assisting layer 20 by applying a physical force to the surface of the attachment assisting layer 20 or chemically treating the surface thereof. Even in this case, irregular concavo-convex patterns may be formed on the surface of the attachment assisting layer 20 as in the embodiment of FIG. 3. However, the present invention is not limited thereto, and concavo-convex patterns may also be formed in a regular shape.

The attachment assisting layer 20 may be made of a transparent material such as polyester, acrylpolyol, or polyamide. However, the present inventive concept is not limited thereto, and the attachment assisting layer may contain colored ink to express a specific color. When the attachment assisting layer is colored, it can perform a decoration function by assisting the decorative print pattern 10.

The decorative print pattern 10 and the attachment assisting layer 20 may include at least one opening 50 or 60. As will be described later, an imaging member 500 such as a camera sensor or an iris recognition sensor may be disposed in the opening 50. However, the present inventive concept is not limited thereto, and an infrared sensor, an LED sensor for iris recognition, or the like may be disposed in the opening 60. Planar arrangement and specific sectional shapes of the decorative print pattern 10 and the attachment assisting layer 20 will be described later with reference to FIGS. 4 to 7.

Referring to FIGS. 1 and 2 again, the bracket 400 is disposed under the window 200 and the display panel 100. The bracket 400 accommodates electronic components such as the touch member 300 and the display panel 100. The bracket 400 may have a rectangular box shape including a storage region therein. That is, the bracket 400 includes a bottom surface 401 and four side walls 402 extending from the bottom surface 401. The display panel 100 or the like may be disposed in the inner space formed by the bottom surface 401 and the side walls 402. The window 200 may disposed on the side walls 402.

The bracket 400 can protect components such as the display panel 100 from an external impact, and can block the inside and outside of the display device 1 to prevent external foreign matter from penetrating into the display device 1. For example, the side walls 402 of the bracket 400 can be tightly attached to the window 200 without lifting space, thereby blocking the inflow passage of the external foreign matter. Therefore, it is possible to prevent external foreign matter such as water from penetrating into electronic components (for example, the display panel 100, the touch member 300, and the imaging member 500) disposed in the display device 1, thereby improving a waterproof function.

The attaching member 30 is disposed between the window 200 and the bracket 400. The attaching member 30 attaches the window 200 and the bracket 400 such that the window 200 and the bracket 400 are fixed. The attaching member may be a waterproof tape. That is, the attaching member 30 tightly attaches the window 200 and the bracket 400 without lifting space to block the movement path of moisture, thereby performing the above waterproof function.

Specifically, the attaching member 30 may be disposed along the both long sides LS1 and LS2 and both short sides SS1 and SS2 of the display device 1. The attaching member 30 disposed at the both long sides LS1 and LS2 may be disposed on the display panel 100. In contrast, the attaching member 30 disposed at the both short sides SS1 and SS2 may be disposed to overlap the attachment assisting layer 20. The attaching member 30 may be in direct contact with the lower surface of the attachment assisting layer 20. The attaching member 30 and the attachment assisting layer 20 may have the same size, and may be disposed to completely overlap each other. The side surface of the attaching member may be substantially aligned with the side surface of the attachment assisting layer 20. The attaching member 30 may also include an opening in an area overlapping the opening of the attachment assisting layer 20.

The attaching member 30 may be made of, for example, a double-sided tape. The double-sided tape includes a substrate (not shown) and an adhesive layers (not shown) disposed on the upper and lower surface of the substrate. The substrate may be made of polyethylene terephthalate (PET), polyimide (PI), polycarbonate (PC), polyethylene (PE), polypropylene (PP), polysulfone (PSF), polymethylmethacrylate (PMMA), triacetylcellulose (TAC), or cycloolefin polymer (COP). The adhesive layer may contain a polymer material such as a silicon-based polymer, a urethane-based polymer, a SU polymer having a silicon-urethane hybrid structure, an acrylic polymer, an isocyanate-based polymer, a polyvinyl alcohol-based polymer, a gelatin-based polymer, a vinyl-based polymer, a latex-based polymer, a polyester-based polymer, or an aqueous polyester-based polymer, but the present inventive concept is not limited thereto.

The display device 1 may further include an imaging member 500. The imaging member may include a substrate 501 and an imaging sensor 502 disposed on the substrate 501. For example, the imaging sensor 502 may be a camera sensor for imaging a photograph or a moving picture, or an iris recognition sensor, but is not limited thereto. The imaging member 500 may be disposed corresponding to the opening 50 of the decorative print pattern 10 and the attachment assisting layer 20.

On the plane, the imaging sensor 502 may not overlap the decorative print pattern 10 and the attachment assisting layer 20. However, the present inventive concept is not limited thereto, and, on the plane, the imaging sensor 502 may overlap the decorative print pattern 10 and/or the attachment assisting layer 20. However, even in this case, a sensor area for actually photographing a subject is not covered by the decorative print pattern 10 and/or the attachment assisting layer 20. Specifically, for example, light that has been reflected from a subject (not shown) and has passed through the window 200 and the opening of the decorative print pattern 10 and the attachment assisting layer 20 may be incident on the imaging sensor 502. If an obstacle such as the decorative print pattern 10 and/or the attachment assisting layer 20 is disposed between the subject and the imaging sensor 502, stains occurs in the photograph, so that the subject is not completely carried, and the image quality of a camera can be deteriorated. Therefore, the decorative print pattern 10 and the attachment assisting layer 20 are not disposed between the imaging sensor 502 and the window 200, thereby improving the image quality.

In an embodiment, the imaging member 500 may be disposed to be inserted into a through hole penetrating the bracket 400 in a thickness direction. Specifically, the substrate 501 of the imaging member 500 may be disposed beneath the bracket 400, and the imaging sensor 502 of the imaging member 500 may be disposed to be inserted into the through hole. The through hole may overlap the opening of the decorative print pattern 10 and the attachment assisting layer 20.

Although not shown in the drawings, in another embodiment, the bracket 400 may not include a through hole. In this case, the imaging member 500 may be accommodated inside the bracket 400.

Hereinafter, the decorative print pattern 10 and the attachment assisting layer 20 will be described in detail.

Figure 4:
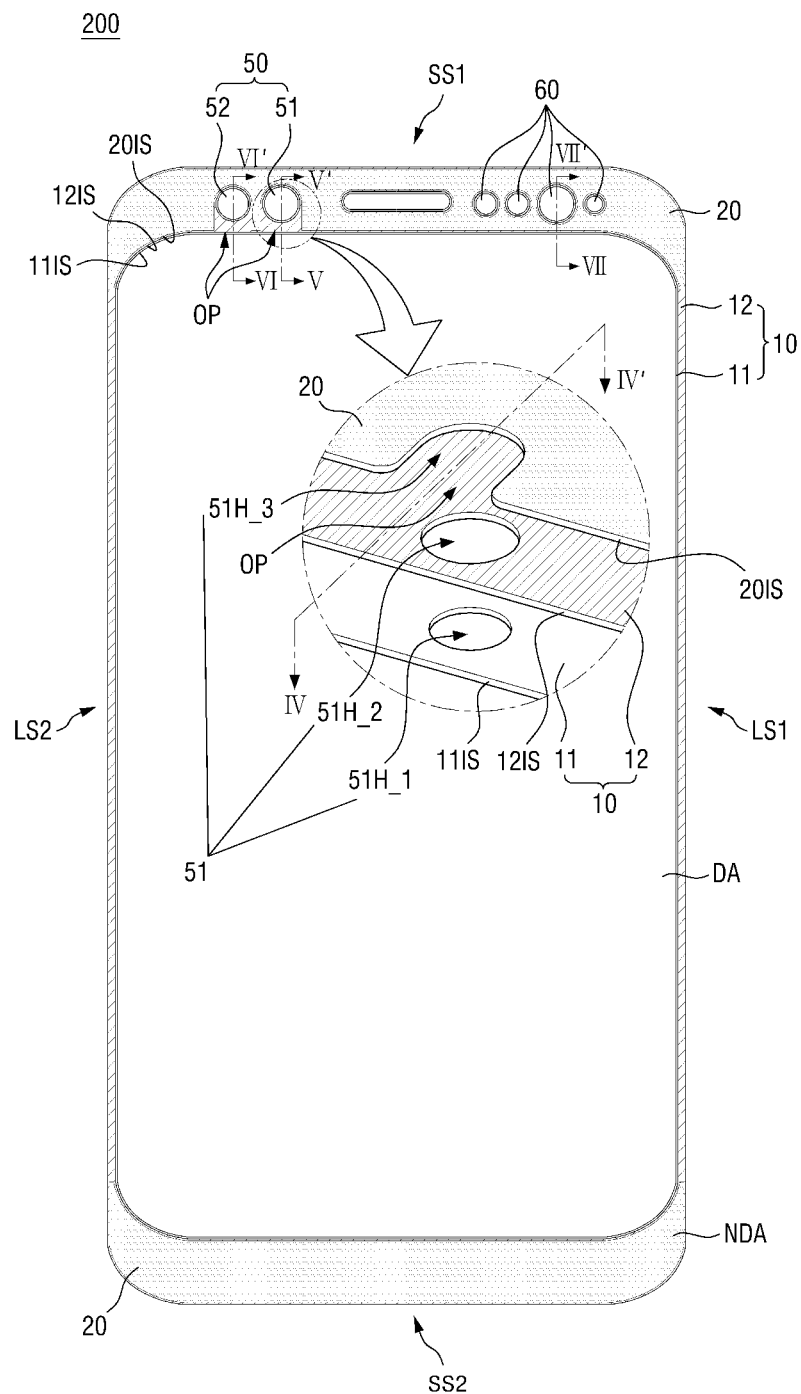
FIG. 4 is a rear view showing the lower surface of a window.
Figure 5:
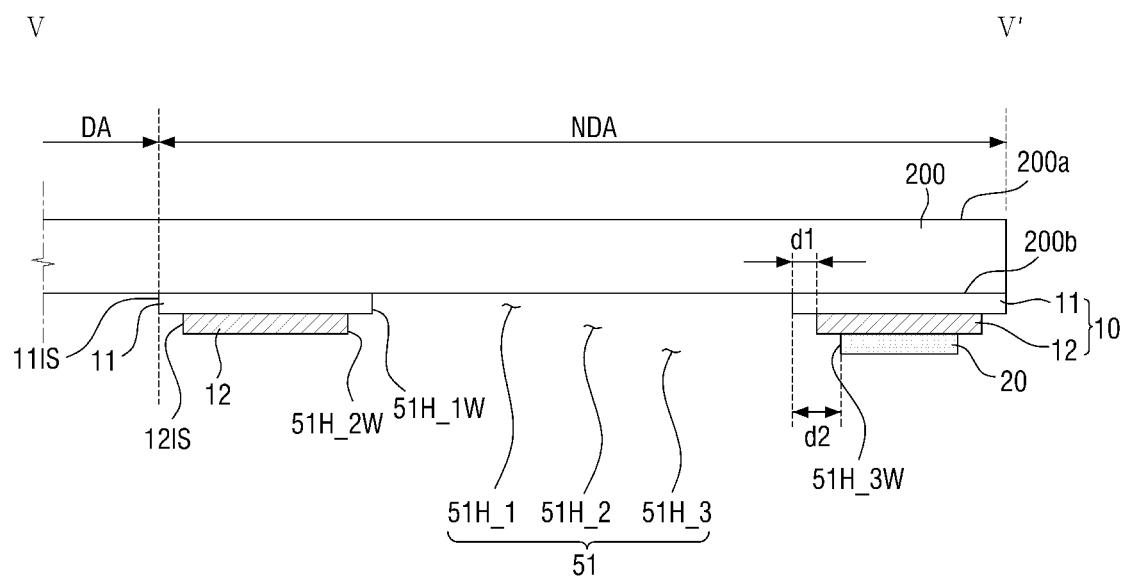
FIG. 5 is a sectional view taken along the line V-V' of FIG. 4.
Figure 6:
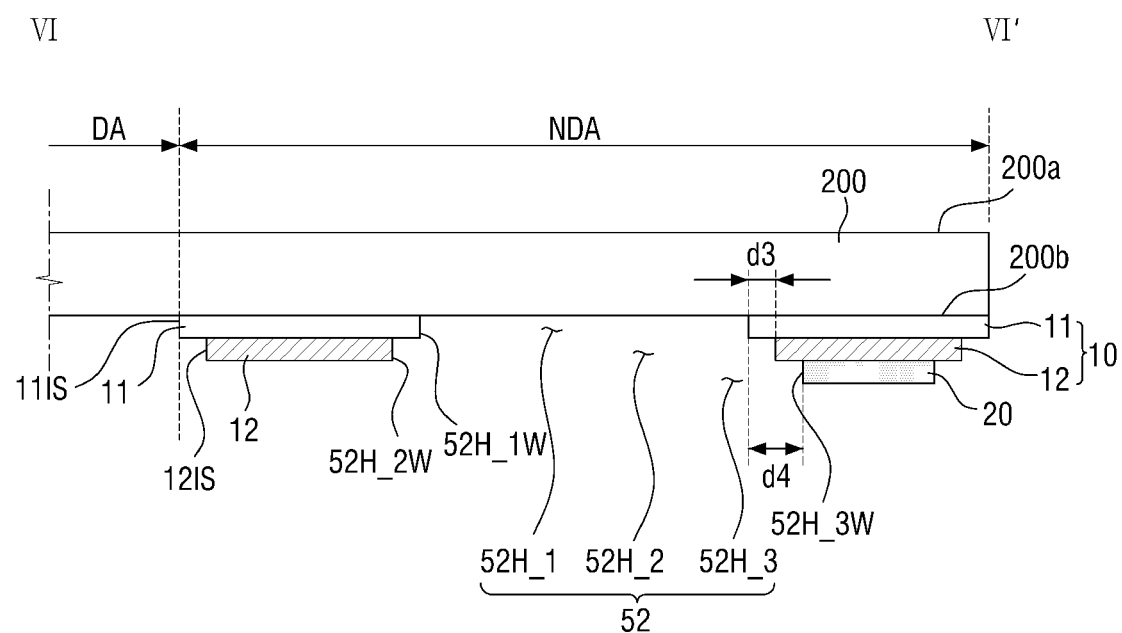
FIG. 6 is a sectional view taken along the line VI-VI' of FIG. 4.
Figure 7:
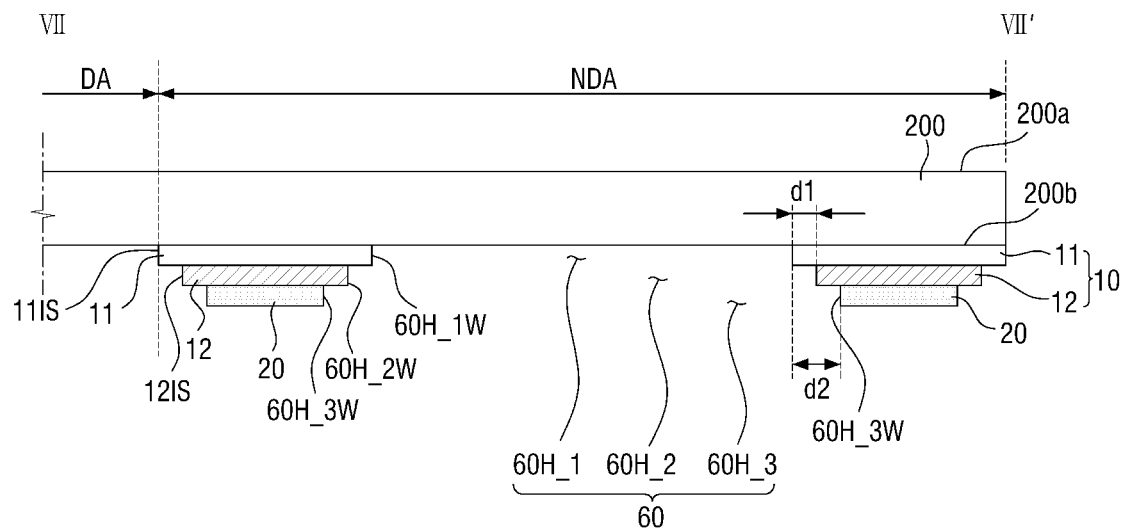
FIG. 7 is a sectional view taken along the line VII-VII' of FIG. 4.

FIG. 4 is a rear view showing the lower surface of a window. FIG. 5 is a sectional view taken along the line V-V' of FIG. 4. FIG. 6 is a sectional view taken along the line VI-VI' of FIG. 4. FIG. 7 is a sectional view taken along the line VII-VII' of FIG. 4.

Referring to FIGS. 4 to 7, the first decorative print layer 11, the second decorative print layer 12, and the attachment assisting layer 20 may be sequentially disposed on the lower surface 200b of the window 200.

The decorative print pattern 10 may have a continuous shape along both long sides LS1 and LS2 and both short sides SS1 and SS2. The first decorative print layer 11 may be larger than the second decorative print layer 12. The inner surface 11IS of the first decorative print layer 11 may protrude with respect to the inner surface 12IS of the second decorative print layer 12. The inner surface 11IS of the first decorative print layer 11 may be substantially aligned with a boundary between the display area DA and the non-display area NDA. The inner surface 12IS of the second decorative print layer 12 may be disposed outside the boundary between the display area DA and the non-display area NDA. In other words, the inner surface 12IS of the second decorative print layer 12 may be disposed on the lower surface of the first decorative print layer 11. The first and second decorative print layers may be formed by applying a colored ink layer using silk printing or pad printing and then drying the colored ink layer. In this case, the display area DA may be stained due to a phenomenon that the colored ink layer splashes or overflows outside a printing area in the process of forming the second decorative print layer 12 after forming the first decorative print layer 11. Thus, an offset is provided between the inner surface 12IS of the second decorative print layer 12 and the inner surface 11IS of the first decorative print layer 11, thereby preventing the second decorative print layer 12 from intruding toward the display area DA and printing.

The outer surface of the first decorative print layer 11 may be substantially aligned with the outer surface of the second decorative layer 12. However, the present inventive concept is not limited thereto, and the outer surface of the first decorative print layer 11 may protrude from the outer surface of the second decorative print layer 12. In this case, the outer surface of the second decorative print layer 12 may be disposed on the lower surface of the first decorative print layer 11.

The attachment assisting layer 20 may be disposed only at the long sides SS1 and SS2 side, and may not be disposed at the long sides LS1 and LS2. That is, since the attachment assisting layer 20 functions to increase the attachment force between the decorative print pattern 10 and the attaching member 30, the attachment assisting layer 20 may not be disposed at the long sides LS1 and LS2 where the decorative printing pattern 10 and the attaching member 30 do not overlap each other.

The attachment assisting layer 20 extends continuously along one short side SS1 or SS2, but may partially extend toward the other short side SS1 or SS2 along one long side LS1 or LS2, so as to surround the corner of the display area DA.

The attachment assisting layer 20 may be smaller than the second decorative print layer 12 in size on the plane. The inner surface 12IS of the second decorative print layer 12 may protrude with respect to the inner surface 20IS of the attachment assisting layer 20. That is, the inner surface 20IS of the attachment assisting layer 20 may be disposed on the lower surface of the second decorative print layer 12. The inner surface 12IS of the second decorative print layer 12 and the inner surface 20IS of the attachment assisting layer 20 may be sequentially arranged outward from the inner surface 11IS of the first decorated print layer 11. The inner surface 20IS of the attachment assisting layer 20 is also disposed at a predetermined step from the inner surfaces 11IS and 12IS of the first decorative print layer 11 and the second decorative print layer 12, thereby preventing the attachment assisting layer 20 from intruding toward the display area DA.

The outer surface of the attachment assisting layer 20 may be substantially aligned with the outer surface of the second decorative layer 12. However, the present inventive concept is not limited thereto, and the outer surface of the second decorative print layer 12 may protrude from the outer surface of the attachment assisting layer 20.

Each of the decorative print pattern 10 and the attachment assisting layer 20 may include at least one opening 50 or 60 exposing the window 200. For example, the decorative print pattern 10 and the attachment assisting layer 20 may include an opening 50 in which the imaging member 500 is disposed, and an opening 60 in which an electronic component other than the imaging member 500 is disposed. Specifically, the decorative print pattern 10 and the attachment assisting layer 20 may include a first opening 51 in which the imaging member 500 is disposed, a second opening 52, and a third opening 60 in which an electronic component other than the imaging member 500 is disposed. The first and second openings 51 and 52 may be different from the third opening 60 in shape in that image quality may be deteriorated by an obstacle disposed between the subject and the imaging member 500 in view of characteristics of the imaging member 500.

First, specifically explaining the first opening 51, the first opening 51 may be disposed in the non-display area NDA at the short sides SS1 and SS2. The imaging member 500 including the aforementioned camera sensor may be disposed in the first opening 51.

The first opening 51 may include a 1-1st opening 51H_1 disposed in the first decorative print layer 11, a 1-2nd opening 51H_2 disposed in the second decorative printing layer 12, and a 1-3rd opening 51H_3 disposed in the attachment assisting layer 20. The 1-1st to 1-3rd openings 51H_1 to 51H_3 may be disposed to overlap each other and spatially connected to each other. Accordingly, the lower surface 200b of the window 200 may be exposed through a connection passage of the 1-1st to 1-3rd opening 51H_1 to 51H_3.

The 1-1st opening 51H_1 may have a hole shape penetrating the first decorative print layer 11 in the thickness direction. The 1-1st opening 51H_1 may have a continuous closed curved shape. The planar shape of the 1-1st opening 51H_1 is not particularly limited, and may be, for example, a circular shape as shown in FIG. 4. When the 1-1st opening 51H_1 has a circular shape on the plane, the inner wall 51H_1W of the 1-1st opening 51H_1 is perpendicular to one surface of the first decorative print layer 11, and the 1-1st opening 51H_1 may be a cylindrical shape as a whole.

The 1-2nd opening 51H_2 is disposed to overlap the 1-1st opening 51H_1. The 1-2nd opening 51H_2 may have a shape corresponding to that of the 1-1st opening 51H_1. That is, similarly to the 1-1st opening 51H_1, the 1-2nd opening 51H_2 may have a continuous closed curved shape. When the 1-2nd opening 51H_2 has a circular shape on the plane, the inner wall 51H_2W of the 1-2nd opening 51H_2 is perpendicular to one surface of the second decorative print layer 12, and the 1-2nd opening 51H_2 may be a cylindrical shape as a whole.

The 1-2nd opening 51H_2 is larger than the 1-1st opening 51H_1 in size, and the 1-2nd opening 51H_2 may completely surround the edge of the 1-1st opening 51H_1. The diameter of the 1-2nd opening 51H_2 may be larger than the diameter of the 1-1st opening 51H_1. In other words, the planar area of the 1-2nd opening 51H_2 may be larger than that of the 1-1st opening 51H_1. The 1-1st opening 51H_1 and the 1-2nd opening 51H_2 may have a stepped shape in which a diameter increases further away from the lower surface 200b of the window 200.

The inner wall 51H_2W of the 1-2nd opening 51H_2 may be disposed outside the inner wall 51H_1W of the 1-1st opening 51H_1. That is, the inner wall 51H_2W of the 1-2nt opening 51H_2 may be disposed on the lower surface of the first decorative print layer 11. Similarly to the description of the arrangement relationship of the inner surfaces 11IS and 12IS of the first decorative print layer 11 and the second decorative print layer 12, a step is provided between the inner wall 51H_1W of the 1-1st opening 51H_1 and the inner wall 51H_2W of the 1-2nd opening 51H_2, thereby preventing the second decorative print layer 12 from intruding into the 1-1st opening 51H_1.

The 1-3rd opening 51H_3 is disposed to overlap the 1-1st opening 51H_1 and the 1-2nd opening 51H_2. The 1-3rd opening 51H_3 is larger than the 1-1st opening 51H_1 and the 1-2nd opening 51H_2 in size, and the 1-1st opening 51H_1 and the 1-2nd opening 51H_2 may completely overlap the 1-3rd opening 51H_3. On the plane, the lower surface of the window 200 and the 1-1st opening 51H_1 and the 1-2nd opening 51H_2 may be exposed through the 1-3rd opening 51H_3.

Unlike the 1-1st opening 51H_1 and the 1-2nd opening 51H_2, the 1-3rd opening 51H_3 does not have a closed curved shape, and may have a curved shape including an open portion OP. Both ends of the 1-3rd opening 51H_3 may be connected to the inner surface 20IS of the attachment assisting layer 20 to form the open portion OP. The open portion OP may be disposed adjacent to the display area DA. That is, the 1-3rd opening 51H_3 may be a bay shape that is recessed from the inner surface 20IS of the attachment assisting layer 20 to the outer surface thereof. Thus, the 1-3rd opening 51H_3 may not completely surround the edges of the 1-1st opening 51H_1 and the 1-2nd opening 51H_2. Specifically, the 1-3rd opening 51H_3 substantially surrounds the edges of the 1-1st opening 51H_1 and the 1-2nd opening 51H_2, e.g., surround at least 50% of the area of the edges, but may nevertheless leave open the 1-1st opening 51H_1 and the 1-2nd opening 51H_2 without completely surrounding the 1-1st opening 51H_1 and the 1-2nd opening 51H_2. In this case, a part of the lower surface of the second decorative print layer 12 adjacent to the display area DA may be exposed by the 1-3rd opening 51H_3.

The 1-3rd opening 51H_3 may not be provided with the attaching assistant layer 20 in an area adjacent to the display area DA. Even though the attaching assistant layer 20 is not disposed in an area adjacent to the display area DA, the aforementioned waterproof function can be maintained. That is, since the attachment assisting layer 20 is still disposed on the outer periphery of the display device 1, the window 200 and the attaching member 30 and the attaching member 30 and the bracket 400 are tightly attached to each other without a space, so that it is possible to prevent moisture from entering from the outside.

Meanwhile, the 1-3rd opening 51H_3 includes the open portion OP, thereby reducing the probability of the attachment assisting layer 20 intruding the window 200 exposed by the first opening 51. Specifically, the attachment assisting layer 20 may be formed by a pad printing method. According to the pad printing method, the attachment assisting layer 20 may be formed by transferring an attaching assisting composition including a pattern onto a pad and then further transferring this composition onto the window 200. In this embodiment, the attachment assisting layer 20 may be formed by transferring the attaching assisting composition by attaching the pad onto the decorative print pattern 10 and detaching the pad therefrom. However, in the pad printing method, static electricity is generated in the process of detaching the pad from the decorative print pattern 10, so that the attaching assisting composition may be splashed toward the lower surface 200b of the window 200 exposed by the first opening 51. As described above, the attachment assisting layer 20 may be disposed on the photographing path of the imaging member 500 disposed on the first opening 51, so that image quality may be deteriorated due to the occurrence of stains on the photographed object. Therefore, when the 1-3rd opening 51H_3 includes the open portion OP to open the edges of the 1-1st opening 51H_1 and the 1-2nd opening 51H_2, the area where the attachment assisting layer 20 is disposed around the first opening 51 is reduced, so that the probability of the attachment assisting layer 20 intruding the lower surface of the window 200 is reduced.

The inner wall 51H_3W of the 1-3rd opening 51H_3 may be disposed on the lower surface of the second decorative print layer 12. The shortest distance d2 between the inner wall 51H_1W of the 1-1st opening 51H_1 and the inner wall 51H_3W of the 1-3rd opening 51H_3 may be about 0.4 mm to about 0.8 mm. When the step between the inner wall 51H_1W of the 1-1st opening 51H_1 and the inner wall 51H_3W of the 1-3rd opening 51H_3 is 0.4 mm or more, it is effective in preventing the attachment assisting layer 20 from being formed on the lower surface 200b of the window 200 exposed by the first open portion 51. The attachment force of the attaching member 30 is proportional to the area in which the attachment assisting layer 20 is disposed. In this case, when the step between the inner wall 51H_1W of the 1-1st opening 51H_1 and the inner wall 51H_3W of the 1-3rd opening 51H_3 is 0.8 mm or less, it is possible to secure a sufficient area for increasing the attachment force of the attaching member 30.

The second opening 52 may be disposed adjacent to the first opening 51. However, the present inventive concept is not limited thereto, and the second opening 52 may be disposed regardless of the position of the first opening 51. However, even in this case, the second opening 52 should be disposed in the non-display area NDA. The imaging member 500 including the iris recognition sensor may be disposed in the second opening 52.

The second opening 52 may include a 2-1st opening 52H_1 disposed in the first decorative print layer 11, a 2-2nd opening 52H_2 disposed in the second decorative printing layer 12, and a 2-3rd opening 52H_3 disposed in the attachment assisting layer 20. The 2-1st opening 52H_1, 2-2nd opening 52H_2, and 2-3rd opening 52H_3 may be spatially connected to each other, and may expose the lower surface 200b of the window 200.

The 2-1st opening 52H_1 may correspond to the 1-1st opening 51H_1, the 2-2nd opening 52H_2 may correspond to 1-2nd opening 51H_2, and 2-3rd opening 52H_3 may correspond to the 1-3rd opening 51H_3. That is, each of the 2-1st opening 52H_1 and 2-2nd opening 52H_2 may have a continuous curved shape, for example, a hole shape which is a planar circular shape. The edge of the 2-1st opening 52H_1 may be completely surrounded by the 2-2nd opening 52H_2. Similarly to the 1-3rd opening 51H_3, the 2-3rd opening 52H_3 may have a curved shape having an open portion OP, not a closed curved shape. Both ends of the 2-3rd opening 52H_3 are respectively connected to the inner surface 201S of the attachment assisting layer 20, and the 2-3rd opening 52H_3 may have a planar bay shape. Therefore, the 2-3rd opening 52H_3 may open the 2-1st opening 52H_1 and the 2-2nd opening 52H_2 without surrounding the edges of the 2-1st opening 52H_1 and the 2-2nd opening 52H_2.

As described above, since the attachment assisting layer 20 is not disposed on an area adjacent to the display area DA by the 2-3rd openings 52H_3 including the open portion OP, it is possible to prevent the attachment assisting layer 20 from being disposed on the lower surface 200b of the window 200 exposed by the second opening 52.

The planar size of the second opening 52 may be smaller than the planar size of the first opening 51. Specifically, the diameter of the 1-1st opening 51H_1 may be larger than the diameter of the 2-1st opening 52H_1. The diameter of the 1-2nd opening 51H_2 may be larger than the diameter of the 2-2nd opening 52H_2. However, the present inventive concept is not limited thereto, and the size of the second opening 52 may be appropriately adjusted depending on the size of the imaging member 500 disposed on the first opening 51 and the second opening 52.

The shortest distance d3 between the inner wall 52H_1W of the 2-1st opening 52H_1 and the inner wall 52H_2W of the 2-2nd opening 52H_2 may be equal to the shortest distance d1 between the inner wall 51H_1W of the 1-1st opening 51H_1 and the inner wall 51H_2W of the 1-2nd opening 51H_2. That is, the shortest distance d3 between the inner wall 52H_1W of the 2-1st opening 52H_1 and the inner wall 52H_2W of the 2-2nd opening 52H_2 may be about 0.2 mm or more. The shortest distance d4 between the inner wall 52H_1W of the 2-1st opening 52H_1 and the inner wall 52H_3W of the 2-3rd opening 52H_3 may be equal to the shortest distance d2 between the inner wall 51H_1W of the 1-1st opening 51H_1 and the inner wall 51H_2W of the 1-2nd opening 51H_2. That is, the shortest distance d4 between the inner wall 52H_1W of the 2-1st opening 52H_1 and the inner wall 52H_3W of the 2-3rd opening 52H_3 may be about 0.4 mm to about 0.8 mm.

The third opening 60 may be disposed to be somewhat spaced apart from the first opening 51. However, the present inventive concept is not limited thereto, and the third opening 60 may be disposed adjacent to the first opening 51. However, even in this case, the third opening 60 is disposed in the non-display area NDA. Unlike the first opening 51 and the second opening 52, the third opening 60 may not be provided with the imaging member 500. For example, an LED sensor for iris recognition may be disposed corresponding to the third opening 60.

The third opening 60 may include a 3-1st opening 60H_1 disposed in the first decorative print layer 11, a 3-2nd opening 60H_2 disposed in the second decorative printing layer 12, and a 3-3rd opening 60H_3 disposed in the attachment assisting layer 20.

Similarly to the aforementioned 1-1st opening 51H_1, 2-1st opening 52H_1, 1-2nd opening 51H_2, and 2-2nd opening 52H_2, each of the 3-1st opening 60H_1 and the 3-2nd opening 60H_2 may have a continuous closed curved shape. The 3-2nd opening 60H_2 may be larger than the 3-1st opening 60H_1 in size on the plane, and may surround the edge of the 3-1st opening 60H_1. The inner wall 60H_2W of the 3-2nd opening 60H_2 may be disposed on the lower surface of the first decorative print layer 11, and the inner wall 60H_2W of the 3-2nd opening 60H_2 may be disposed outside the inner wall 60H_1W of the 3-1st opening 60H_1.

Unlike the 1-3rd opening 51H_3 and the 2-3rd opening 52H_3, the 3-3rd opening 60H_3 may have a continuous closed curved shape. That is, the 3-3rd opening 60H_3 may not include the open portion OP. The 3-3rd opening 60H_3 may be larger than the 3-2nd opening 60H_2 in size on the plane, and may surround the edge of the 3-2nd opening 60H_2. The inner wall 60H_3W of the 3-3rd opening 60H_3 may be disposed on the lower surface of the second decorative print layer 12, and the inner wall 60H_3W of the 3-3rd opening 60H_3 may be disposed outside the inner wall 60H_2W of the 3-2nd opening 60H_2. The third opening 60 may have a stepped shape in which a diameter increases as being away from the lower surface 200b of the window 200.

As described above, the attachment force between the attaching member 30 and the decorative print pattern 10 can be increased by disposing the attachment assisting layer 20 between the attaching member 30 and the decorative print pattern 10. The decorative print pattern 10 and the attaching member 30, and the attaching member 30 and the bracket 400 are closely attached to each other, thereby preventing external foreign matter such as moisture from penetrating into the display device 1.

Further, in the opening 50 in which the imaging member 500 is disposed, the 1-3rd opening 51H_3 and 2-3rd opening 52H_3 disposed in the attachment assisting layer 20 include the open portion OP, thereby preventing the attachment assisting layer 20 from projecting or intruding the lower surface 200b of the window 200 exposed by the opening. In particular, the open portion OP is disposed toward the display area DA, and the attachment assisting layer 20 is disposed on the outer periphery of the display device with respect to the opening 50, thereby maintaining the aforementioned waterproof function.

Hereinafter, other embodiments relating to the attachment assisting layer will be described. In the following embodiments, components the same as those having been previously described will not be described or will be simplified, and differences will be mainly described.

Figure 8:
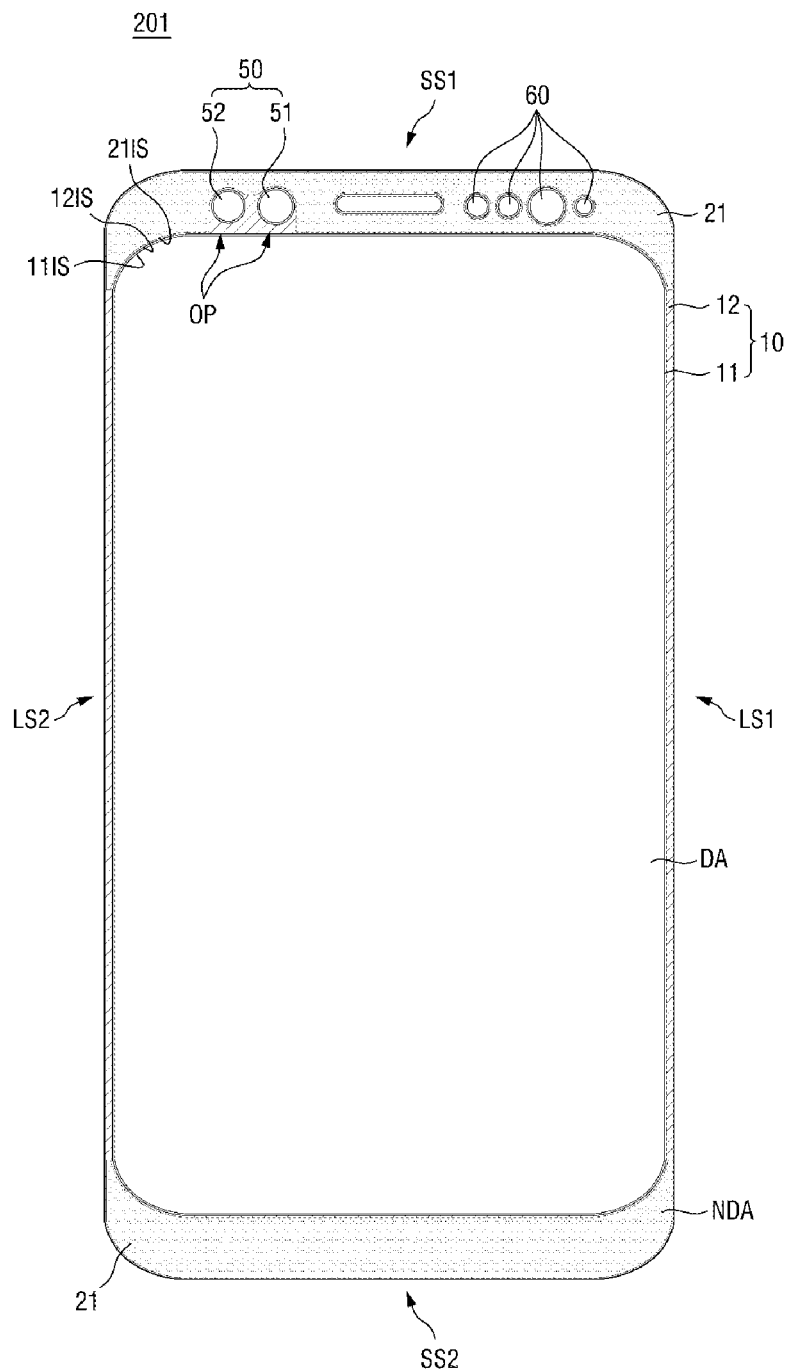
FIG. 8 is a rear view showing the arrangement of an attachment assisting layer according to another embodiment.

FIG. 8 is a rear view showing the arrangement of an attachment assisting layer according to another embodiment.

FIG. 8 illustrates a case where the 1-3rd opening 51H_3 and 2-3rd opening 52H_3 of an attachment assisting layer 21 disposed on a window 201 may be connected to each other. The attachment assisting layer 20 of FIG. 4 is different from the attachment assisting layer 21 of FIG. 8 in that the 1-3rd opening 51H_3 and 2-3rd opening 52H_3 of the attachment assisting layer 20 disposed on the window 200 may be spaced apart from each other and the attachment assisting layer 20 may be disposed between the first opening 51 and the second opening 52.

Referring to FIG. 8, the attachment assisting layer 21 may include a 1-3rd opening 51H_3 and a 2-3rd opening 52H_3. Each of the 1-3rd opening 51H_3 and the 2-3rd opening 52H_3 may have a curved shape including both ends. That is, the 1-3rd opening 51H_3 and the 2-3rd opening 52H_3 may include an open portion OP.

The 1-3rd opening 51H_3 and the 2-3rd opening 52H_3 may be connected to each other. Specifically, one end of both ends of the 1-3rd opening 51H_3 may be connected to one end of the 2-3rd opening 52H_3, and the other end thereof may be connected to the inner surface 21IS of the attachment assisting layer 21. Similarly, one end of both ends of the 2-3rd opening 52H_3 may be connected to one end of the 1-3rd opening 51H_3, and the other end thereof may be connected to the inner surface 21IS of the attachment assisting layer 21. Therefore, the second decorative print layer 12 disposed between the 1-2nd opening 51H_2 and the 2-2nd opening 52H_2 may be exposed.

In the edge of the 1-2nd opening 51H_2, an area surround by the 1-3rd opening 51H_3 may be smaller than an open area. Similarly, in the edge of the 2-2nd opening 52H_2, an area surround by the 2-3rd opening 52H_3 may be smaller than an open area.

The attachment assisting layer 21 may not be disposed between the 1-2nd opening 51H_2 and the 2-2nd opening 52H_2. The area of the attachment assisting layer 21 disposed around the first opening 51 and the second opening 52 may be reduced. As the area of the attachment assisting layer 21 disposed around the first opening 51 and the second opening 52 is reduced, the possibility of the attachment assisting layer 21 being disposed on the lower surface of the window 201 exposed by the opening 50 is reduced. Thus, the attachment assisting layer 21 is not disposed on the photographing path of the imaging member 500 disposed on the opening 50, so that image quality can be improved. Further, since the attachment assisting layer 21 is still disposed along the outer periphery of the display device 2, the window 201 and the bracket 400 at the outer periphery of the display device 2 can be tightly attached without a lifting space. Therefore, the waterproof function of the display device 2 can be maintained.

Figure 9:
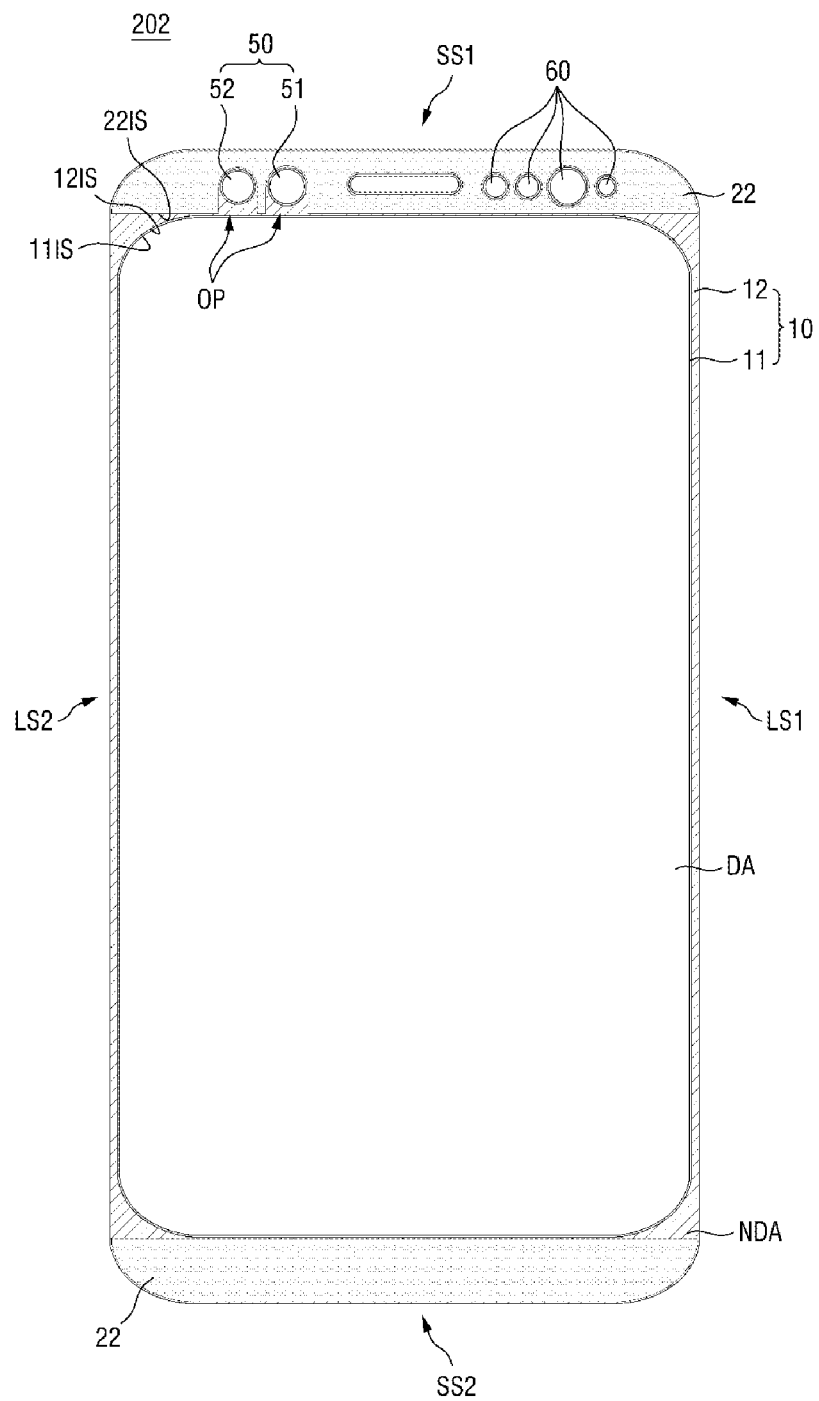
FIG. 9 is a rear view showing the arrangement of an attachment assisting layer according to still another embodiment.

FIG. 9 is a rear view showing the arrangement of an attachment assisting layer according to still another embodiment.

FIG. 9 illustrates a case where the inner surface 22IS of an attachment assisting layer 22 disposed on a window 202 may be disposed substantially in a straight line.

The attachment assisting layer 20 of FIG. 4 is different from the attachment assisting layer 21 of FIG. 9 in that the inner surface 20IS of the attachment assisting layer 20 disposed at one short side SS1 or SS2 is disposed substantially in a straight line along a boundary between the display area DA and the non-display area NDA, and may be bent from both long sides LS1 and LS2 to the other short side SS1 or SS2 to cover the corner of the display area DA.

Referring to FIG. 9, the inner surface 22IS of the attachment assisting layer 22 may be disposed in parallel along the boundary between the display area DA and the non-display area NDA, except for an area in which the open portion of the first opening 51 and the second opening 52 is disposed. The inner surface 22IS of the attachment assisting layer 22 may not be bent toward the other short side SS1 or SS2 even at both long sides LS1 and LS2, and may extend toward both long sides LS1 and LS2. The corner of the display area DA may not be covered by the attachment assisting layer 22, and may be exposed by the attachment assisting layer 22.

When the attachment assisting layer 22 is disposed on the display area DA, the light emitted from the display panel 100 is refracted by the attachment assisting layer 22, so that image quality can be deteriorated. Therefore, the disposition of the attachment assisting layer 22 around the corner of the display area DA is omitted, thereby preventing the attachment assisting layer 22 from projecting or intruding the display area DA.

As described above, according to the display device according to an embodiment, the attachment force between the window and the bracket is improved, so as to prevent the deterioration of image quality of the imaging member while maintaining waterproof function.

The effects of the present inventive concept are not limited by the foregoing, and other various effects are anticipated herein.

Although the preferred embodiments of the present inventive concept have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
   a display panel;
   a window disposed on the display panel, the window including a surface facing the display panel;
   an imaging member disposed below the window, the imaging member facing the surface of the window; and
   a decorative print pattern and an attachment assisting layer sequentially disposed on the surface of the window,
   wherein the decorative print pattern includes a first opening having a closed curved shape and exposing the window,
   the attachment assisting layer includes a second opening overlapping the first opening and exposing the window,
   the second opening includes a first open portion exposing an edge of the first opening, any portion of the attachment assisting layer does not overlap the display panel in a direction perpendicular to the surface of the window,
   the imaging member is disposed in a space which is defined between the display panel and the attachment assisting layer, and the display panel and the attachment assisting layer are spaced apart from each other.

2. The display device of claim 1, wherein the decorative print pattern includes at least one decorative print layer.

3. The display device of claim 1, wherein the decorative print pattern includes a third opening having a closed curved shape and exposing the window,
   the attachment assisting layer includes a fourth opening overlapping the third opening and exposing the window,
   the fourth opening includes a second open portion exposing an edge of the third opening, and
   the first opening and the third opening are disposed to be spaced apart from each other.

4. The display device of claim 3, wherein the second opening and the fourth opening are disposed to be spaced apart from each other.

5. The display device of claim 3, wherein an inner wall of the second opening and an inner wall of the fourth opening are connected to each other, and the first open portion and the second open portion are spatially connected to each other.

6. The display device of claim 1, wherein an inner wall of the second opening is disposed on the decorative print pattern.

7. The display device of claim 6, wherein a shortest distance between the inner wall of the first opening and an inner wall of the second opening is about 0.4 mm to about 0.8 mm.

8. The display device of claim 1, wherein the inner wall of the second opening includes two ends, and the two ends are spaced apart from each other to form the open portion.

9. The display device of claim 8, wherein the attachment assisting layer includes an inner surface disposed adjacent to a center of the display device, and
   the two ends are connected to the inner surface of the attachment assisting layer.

10. The display device of claim 1, wherein the attachment assisting layer includes a first surface facing the decorative print pattern and a second surface opposite to the first surface, and
    wherein the second surface of the attachment assisting layer has an uneven shape.

11. The display device of claim 10, wherein the attachment assisting layer include at least one kind of particles.

12. The display device of claim 10, further comprising:
    an attaching member disposed on the attachment assisting layer,
    wherein the attaching member is in direct contact with the second surface of the attachment assisting layer having the uneven shape.

13. The display device of claim 12, further comprising:
    a bracket disposed under the window,
    wherein the bracket is fixed to the window by the attaching member.

14. The display device of claim 1, wherein the imaging member is disposed to overlap the first opening and the second opening.

15. A display device, comprising:
    a display panel;
    a window disposed on the display panel, the window including a surface facing the display panel;

an imaging member disposed below the window, the imaging member facing the surface of the window;

a first decorative print layer disposed on the surface of the window and including a first opening having a closed curved shape;

a second decorative print layer disposed on the first decorative print layer and including a second opening having a closed curved shape; and an attachment assisting layer disposed on the second decorative print layer and including a third opening, wherein the first to third openings overlap each other and are spatially connected to each other to expose the window, the second opening surrounds an edge of the first opening, the third opening includes an open portion exposing an edge of the second opening, any portion of the attachment assisting layer does not overlap the display panel in a direction perpendicular to the surface of the window, the imaging member is disposed in a space which is defined between the display panel and the attachment assisting layer, and the display panel and the attachment assisting layer are spaced apart from each other.

16. The display device of claim 15, wherein an inner wall of the second opening is disposed on the first decorative print layer.

17. The display device of claim 16, wherein an inner wall of the third opening is disposed on the second decorative print layer.

18. The display device of claim 17, wherein a shortest distance between the inner wall of the first opening and an inner wall of the third opening is about 0.4 mm to about 0.8 mm.

19. The display device of claim 17, wherein the imaging member is disposed to overlap the first to third openings.

20. The display device of claim 16, wherein the window includes a display area and a non-display area surrounding the display area, the first decorative print layer, the second decorative print layer, and the attachment assisting layer are disposed in the non-display area, and the open portion is disposed adjacent to a boundary between the display area and the non-display area.

* * * * *